United States Patent
Affleck et al.

(10) Patent No.: US 7,104,156 B2
(45) Date of Patent: Sep. 12, 2006

(54) STEERING WHEEL MOUNTING HUB

(75) Inventors: John Affleck, Ruthven (CA); Michael Despreaux, Lighthouse Point, FL (US)

(73) Assignees: Dino North America, INC, Pompano Beach, FL (US); Kingsville Plastics, Ltd., Ontario (CA)

( * ) Notice: Subject to any disclaimer, the term of this patent is extended or adjusted under 35 U.S.C. 154(b) by 0 days.

(21) Appl. No.: 10/816,440

(22) Filed: Apr. 1, 2004

(65) Prior Publication Data

US 2004/0216552 A1    Nov. 4, 2004

(51) Int. Cl.
   *B62D 1/10* (2006.01)
(52) U.S. Cl. ....................................... 74/552
(58) Field of Classification Search .................. 74/548, 74/552
   See application file for complete search history.

(56) References Cited

U.S. PATENT DOCUMENTS

| 4,229,994 A | 10/1980 | Plamper |
| 4,721,008 A * | 1/1988 | Stoops et al. ................. 74/552 |
| 4,884,469 A | 12/1989 | Wrigley |
| 5,855,449 A | 1/1999 | Thomas |
| 5,855,451 A | 1/1999 | Milton et al. |
| 5,878,629 A | 3/1999 | Nagata et al. |

FOREIGN PATENT DOCUMENTS

| CH | 346442 | 5/1960 |
| GB | 1 236 264 | 6/1971 |
| JP | 03284475 A * | 12/1991 |

* cited by examiner

*Primary Examiner*—Vicky A. Johnson
(74) *Attorney, Agent, or Firm*—Butzel Long

(57) ABSTRACT

A hub for mounting a steering wheel on a shaft includes a plastic injection molded frustum-shaped body having a generally planar upper surface of a predetermined first diameter and an opposed generally planar lower surface of a predetermined second diameter larger than the first diameter. The upper surface is adapted to receive a plurality of fasteners for attaching the steering wheel thereto. A mounting bore extends through the body between the upper surface and the lower surface, and defines an inner surface that is adapted to receive an end of the steering shaft.

20 Claims, 6 Drawing Sheets

STEERING WHEEL MOUNTING HUB

CROSS-REFERENCE TO RELATED APPLICATION

This application claims the benefit of U.S. provisional patent application Ser. No. 60/326,933 filed Oct. 4, 2001.

BACKGROUND OF THE INVENTION

The present invention relates generally to an apparatus for mounting a steering wheel and, in particular, to a hub for mounting a steering wheel on a shaft.

Prior art mounting hubs, used for boats, golf carts, lawn tractors and the like, typically are mounted on a center shaft and the steering wheel is attached to the hub, generally using bolts or screws. The mounting hub is typically constructed of a cast metal material such as aluminum and the center shaft is typically constructed of a steel alloy. These prior art cast metal mounting hubs have disadvantages in that the mounting hub is subject to corrosion, particularly in a salt water environment. The corrosion occasionally freezes the mounting hub onto the center shaft, making it impossible to remove or, in a worst case scenario, can result in failure of the steering wheel hub.

The prior art cast metal mounting hub is heavy and disadvantageously requires painting for appearance purposes after being manufactured. In addition, the prior art mounting hub often requires a secondary manufacturing process whereby threads are inserted into the cast metal mounting hub to accept a bolt or screw to attach the steering wheel thereto. Alternatively, the prior art hub requires an inefficient assembly process where the steering wheel is bolted onto the mounting hub.

It is desirable, therefore, to provide a hub for mounting a steering wheel on a shaft that is lightweight, is corrosion resistant, is cost effective to manufacture, and does not require painting after being manufactured.

SUMMARY OF THE INVENTION

The present invention concerns a steering wheel mounting hub formed as a plastic injection molded component, which has widespread application in marine environments, and in other applications such as for golf carts, lawn tractors, etc.

The hub for mounting a steering wheel on a shaft in accordance with the present invention includes a plastic injection molded frustum-shaped body having a generally planar upper surface of a predetermined first diameter and an opposed generally planar lower surface of a predetermined second diameter larger than the first diameter. The upper surface is adapted to receive a plurality of fasteners for attaching a steering wheel thereto. A mounting bore extends through the body between the upper surface and the lower surface, and defines an inner surface that is adapted to receive a center or steering shaft.

Preferably, the plastic material used for the mounting hub body is formed of a fiber reinforced plastic, an acetyl co-polymer or similar plastic material. Because plastic is inherently weaker than aluminum or other cast metal materials, the composition of the plastics used and the design of the mounting hub have both required innovation to make it possible to replace the cast metal mounting hubs of the prior art with the plastic material mounting hub according to the present invention.

The plastic steering wheel mounting hub according to the present invention is approximately three times lighter than the cast metal mounting hubs of the prior art, has a lower cost than the mounting hubs of the prior art, and is corrosion resistant, which is particularly important in a salt-water marine environment. The plastic material of the mounting hub is operable to allow the steering wheel to be mounted by self-tapping screws, which is a less expensive assembly technique than bolting a steering wheel onto the mounting hub or developing a secondary manufacturing process whereby threads are inserted into the mounting hubs to accept a bolt or screw.

Furthermore, the plastic steering wheel mounting hub in accordance with the present invention can be colored to suit prior to injection molding and thus requires no painting after being manufactured. The plastic mounting hub also has the ability to be recycled, which an aluminum part, if heavily corroded, does not.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
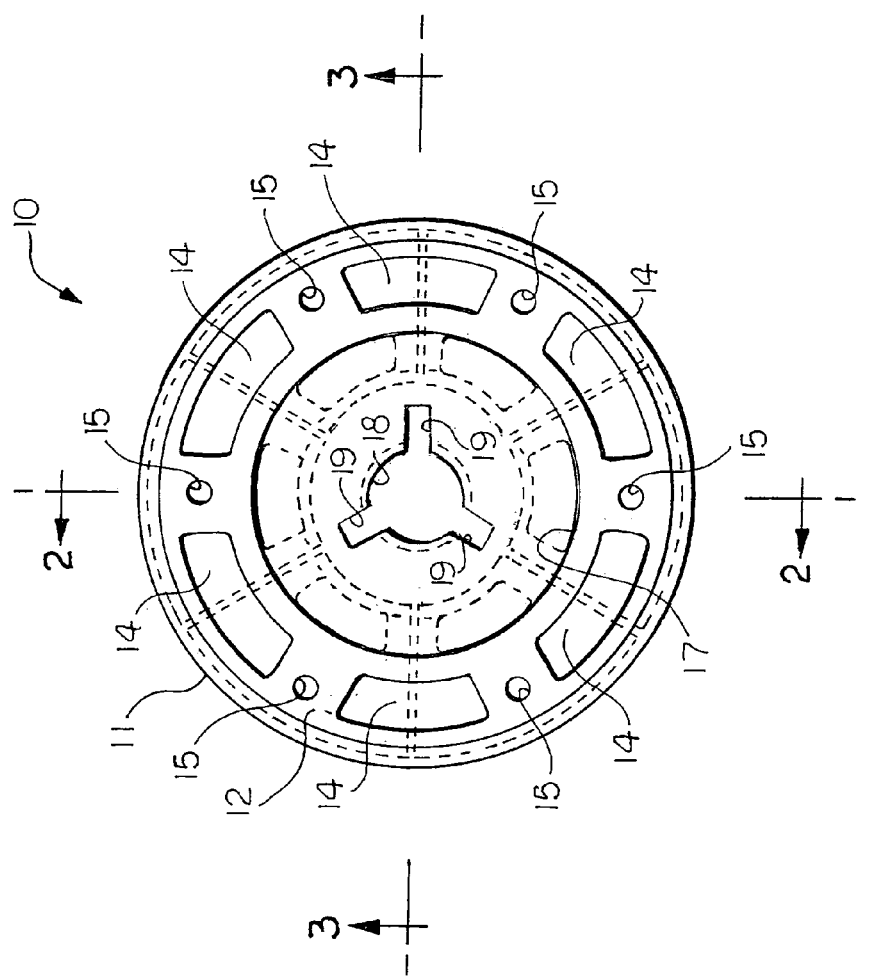
FIG. 1 is a top plan view of a steering wheel mounting hub in accordance with the present invention.

There is shown in the FIGS. 1–6 a steering wheel mounting hub 10 formed as a plastic injection molded component with a frustum-shaped body 11 having a generally planar upper surface 12 of a predetermined first diameter and an opposed generally planar lower surface 13 of a predetermined second diameter larger than the first diameter. The upper surface 12 is adapted to be attached to a steering wheel 27, best seen in FIG. 3, discussed in more detail below. The lower surface 13 is adapted to receive a shaft 25, such as a steering column shaft or the like, best seen in FIG. 3, discussed in more detail below. A plurality of arcuate slots 14 are formed in the body 11 open to the upper surface 12 and equally spaced about the periphery of the upper surface. A plurality of fastener apertures 15 are formed in the body 11 open to the upper surface 12 and equally spaced about the periphery of the upper surface. The slots 14 and the apertures 15 are alternated and are located a predetermined radial distance from a longitudinal axis 16 of the body 11. Preferably, the apertures 15 are dimensioned to receive self-tapping threaded screws or fasteners 29, best seen in FIG. 3, for attaching the steering wheel 27 to the upper surface 12. The plastic material of the mounting hub 10 allows the steering wheel 27 to be mounted by the self-tapping screws 29, which is a less expensive assembly technique than the prior art technique of bolting a steering wheel onto the mounting hub 10 or developing a secondary manufacturing process whereby threads (not shown) are formed in the mounting hub to accept a bolt or screw. Alternatively, the apertures 15 are dimensioned to receive any type of fastener such as screws, bolts, and the like for attaching the steering wheel to the upper surface 12. The slots 14 are formed in the body 11 to reduce the weight of and the amount of plastic material required for the body 11.

Preferably, the plastic material used for the mounting hub body 11 is formed of a fiber reinforced plastic such as a 33% glass reinforced nylon 66, available from DuPont Engineering Polymers of Wilmington, Del. Other suitable plastic materials for the body 11 include, but are not limited to, an acetyl co-polymer or similar plastic material. The hub 10 according to the present invention meets or exeeds the static and dynamic load requirements set out by the American Boat & Yacht Council, advantageously making the plastic material mounting hub 10 a replacement of suitable strength for the cast metal mounting hub as well as suitable for use in marine environments.

Figure 6:
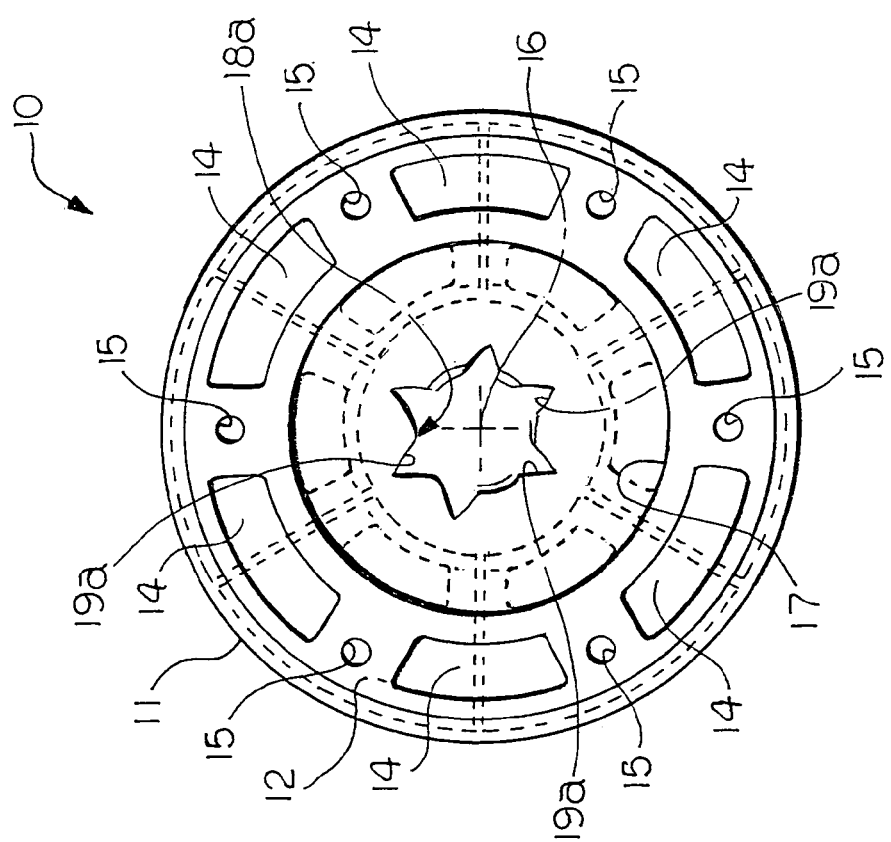
FIG. 6 is a top plan view of a steering wheel mounting hub in accordance with an alternate embodiment of the present invention.

A generally cylindrical center recess 17 is formed in the body 11 open to the: upper surface 12 and centered on the axis 16. The recess 17 is not as deep as either the slots 14 or the apertures 15. A mounting bore 18 is formed in the body 11 centered on the axis 16 and extends from a bottom wall of the recess 17 to the lower surface 13. The bore 18 is tapered in a manner similar to the outside of the body 11 to receive an end of a steering shaft (not shown). Extending radially outwardly from the bore 18 are a plurality of vertically extending grooves 19 for receiving, for example, splines (not shown) on the shaft. Alternatively, referring to FIG. 6, a plurality of vertically extending grooves 19a form a different profile and extend outwardly from the bore 18a for receiving a shaft (not shown) having splines with a star-shaped profile suitable for coupling the steering wheel to the shaft. The radially outwardly extending grooves 19a are generally V-shaped and form a star pattern as shown in FIG. 6 although any suitable pattern of grooves can be used.

Figure 2:
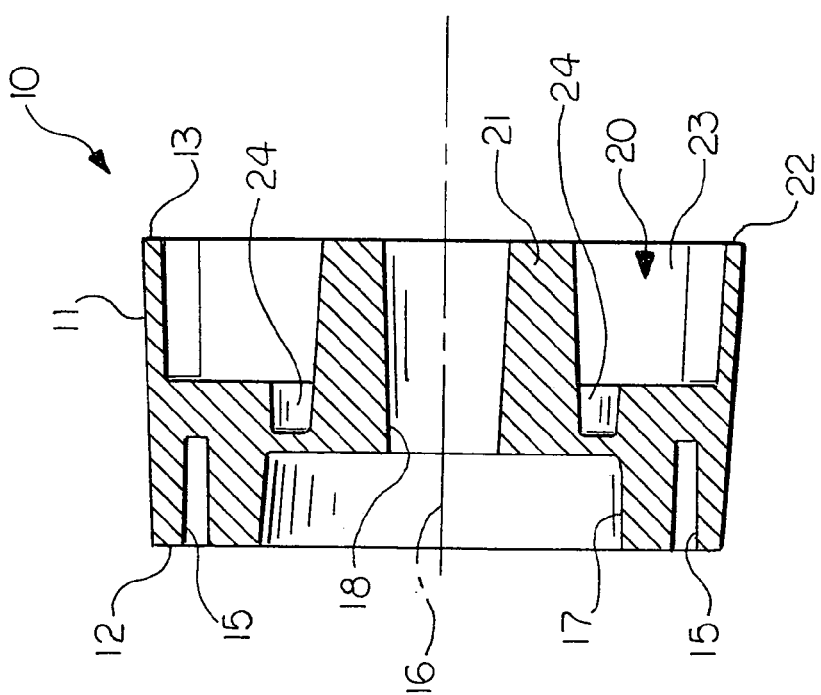
FIG. 2 is cross-sectional view of the hub shown in FIG. 1 taken along the line 2—2.
Figure 5:
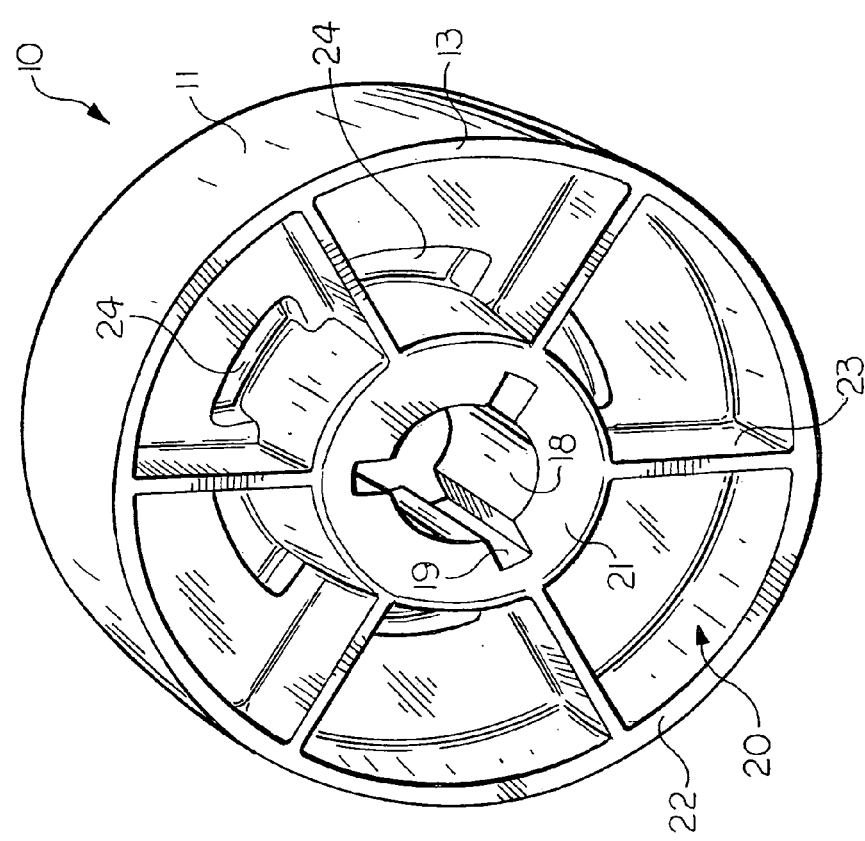
FIG. 5 is a perspective view of the bottom of the hub shown in FIG. 1.

As best shown in FIGS. 2 and 5, an annular recess 20 is formed in the body 11 open to the bottom surface 13 and extending between a central boss 21 and an outer wall 22. The recess 20 is formed to reduce the weight of and the amount of plastic material required for the body 11. A plurality of equally spaced ribs 23 extends radially between the boss 21 and the wall 22 to strengthen the body 11. The ribs 23 divide the recess 20 into a plurality of segments each having an arcuate slot 24 formed in a bottom wall of the recess.

Figure 3:
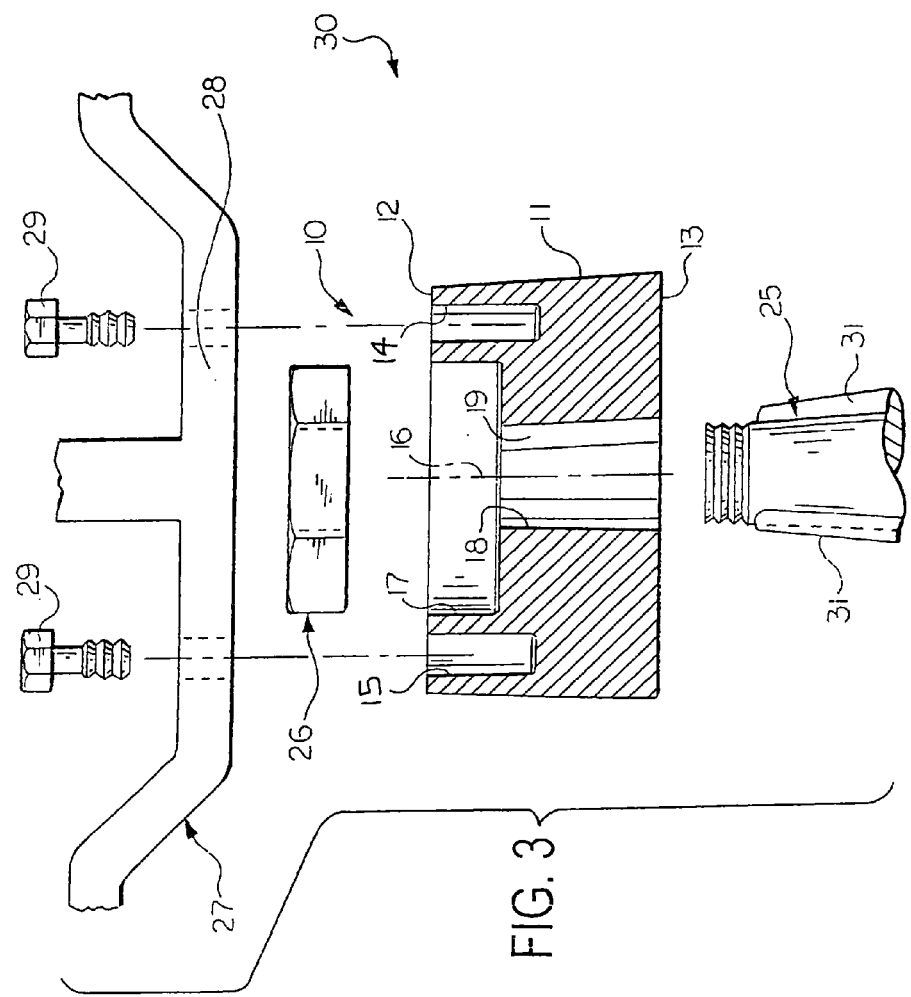
FIG. 3 is an exploded cross-sectional view of the hub shown in FIG. 1 taken along the line 3—3 and shown with a steering wheel, shaft, and fasteners.
Figure 4:
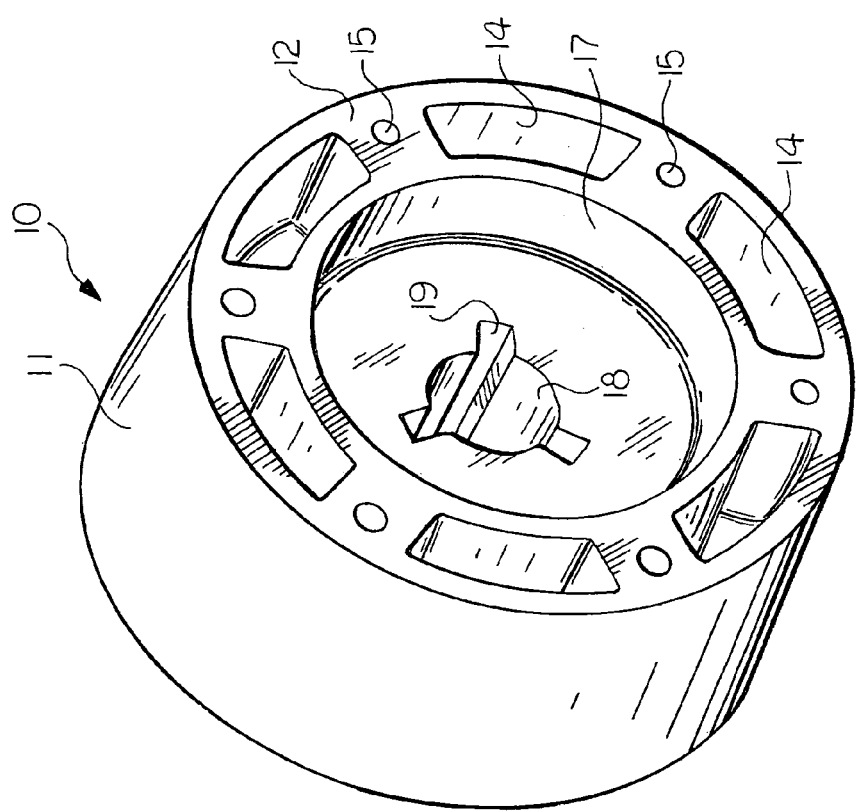
FIG. 4 is a perspective view of the top of the hub shown in FIG. 1.

Referring now to FIG. 3, the mounting hub 10 is shown in exploded view with the tapered shaft 25 having a threaded free end, a retaining nut 26, the steering wheel 27, and a plurality of self-tapping threaded fasteners 29. The steering wheel 27 includes a generally planar mounting portion or center disk 28 for mating with the upper surface 12 of the mounting hub 10. The shaft 25 preferably extends from a steering column (not shown). The threaded free end of the shaft 25 is inserted in the bore 18 and secured to the body 11 by the nut 26. The outer surface of the shaft 25 preferably includes a plurality of splines 31 extending outwardly therefrom for cooperating with the grooves 19 on the mounting hub body 11. The nut 26 is preferably dimensioned to fit in the recess 17 to prevent the shaft 25 and the mounting hub 10 from rotating relative to one another, in conjunction with the grooves 19 and the splines 31. The center disk 28 of the steering wheel 27 mates with the upper surface 12 and the steering wheel 27 is secured to the body 11 by the fasteners 29, which each engage with the interior surface of a corresponding aperture 15 in the upper surface 12. The steering wheel 27 and the mounting hub 10, when attached with the fasteners 29, form a steering wheel assembly, indicated generally at 30.

The plastic steering wheel mounting hub 10 according to the present invention is approximately three times lighter than the cast metal mounting hubs of the prior art, has a lower manufacturing cost than the mounting hubs of the prior art, and is corrosion resistant, which is particularly important in a salt-water marine environment. Furthermore, the plastic steering wheel mounting hub 10 in accordance with the present invention can be colored to suit prior to injection molding and thus requires no painting after being manufactured. The plastic mounting hub 10 also has the ability to be recycled, which an aluminum part, if heavily corroded, does not.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A steering wheel mounting hub comprising:
    a plastic frustum-shaped body having a generally planar upper surface of a predetermined first diameter and an opposed generally planar lower surface of a predetermined second diameter larger than the first diameter;
    at least two apertures formed in said upper surface for attaching a steering wheel thereto, said at least two apertures not extending to said lower surface;
    a recess formed in said upper surface and not extending to said lower surface, said recess and said at least two apertures opening in a common plane of said upper surface; and
    a mounting bore extending through said body open to said recess and said lower surface, said bore defining an inner surface and being adapted to receive an end of a steering shaft whereby said mounting bore prevents the end of the steering shaft from extending above said common plane.

2. The steering wheel mounting hub according to claim 1 wherein said at least two apertures are adapted to receive self-tapping threaded fasteners.

3. The steering wheel mounting hub according to claim 1 wherein said inner surface has a star-shaped profile having no more than six points.

4. The steering wheel mounting hub according to claim 3 wherein said star-shaped profile is formed by a plurality of V-shaped grooves.

5. The steering wheel mounting hub according to claim 1 wherein said inner surface has a cylindrical profile with a plurality of radially outwardly extending grooves.

6. The steering wheel mounting hub according to claim 5 wherein said grooves are rectangular in profile.

7. The steering wheel mounting hub according to claim 1 wherein said recess is adapted to receive a steering shaft nut.

8. The steering wheel mounting hub according to claim 1 including an annular recess formed in said lower surface between a central boss and an outer wall of said body.

9. The steering wheel mounting hub according to claim 8 including a plurality of radially extending ribs connected between said central boss and said outer wall dividing said annular recess into a plurality of segments.

10. The steering wheel mounting hub according to claim 9 wherein each said segment has an associated slot formed in a bottom wall of said recess.

11. The steering wheel mounting hub according to claim 1 wherein said body is formed of a reinforced plastic material.

12. A steering wheel mounting hub comprising:

a plastic frustum-shaped body having a generally planar upper surface of a predetermined first diameter and an opposed generally planar lower surface of a predetermined second diameter larger than the first diameter;

a plurality of fastener apertures formed in said body at said upper surface for receiving fastening means to attach a steering wheel to said upper surface, said fastener apertures not extending to said lower surface;

a central recess formed in said body at said upper surface for receiving a steering wheel retaining nut, said central recess and said fastener apertures opening in a common plane at said upper surface; and a mounting bore formed through said body and centered on a longitudinal axis of said body, said bore extending from said central recess to said lower surface and being tapered to receive an end of a steering shaft whereby said mounting bore prevents an end of a steering shaft from extending above said common plane.

13. The steering wheel mounting hub according to claim 12 wherein said fastener apertures are adapted to receive self-tapping threaded fasteners.

14. The steering wheel mounting hub according to claim 12 wherein said mounting bore has an inner surface with a star-shaped profile having no more than six points.

15. The steering wheel mounting hub according to claim 14 wherein said star-shaped profile is formed by a plurality of V-shaped grooves.

16. The steering wheel mounting hub according to claim 12 wherein said mounting bore has an inner surface with a cylindrical profile and a plurality of radially outwardly extending grooves.

17. The steering wheel mounting hub according to claim 12 including an annular recess formed in said lower surface between a central boss and an outer wall of said body.

18. The steering wheel mounting hub according to claim 17 including a plurality of radially extending ribs connected between said central boss and said outer wall dividing said annular recess into a plurality of segments.

19. The steering wheel mounting hub according to claim 18 wherein each said segment has an associated slot formed in a bottom wall of said recess.

20. A steering wheel assembly comprising:

a steering wheel having a center disk with a plurality of mounting apertures formed therein;

a plurality of fasteners;

a retaining nut; and a mounting hub having a plastic frustum-shaped body with a generally planar upper surface of a predetermined first diameter and an opposed generally planar lower surface of a predetermined second diameter larger than the first diameter, a plurality of fastener apertures formed in said body at said upper surface and retaining said plurality of fasteners, said fastener apertures not extending to said lower surface, a central recess formed in said body open to said upper surface and not extending to said lower surface for receiving said retaining nut, said central recess and said fastener apertures opening in a common plane, and a mounting bore formed in said body extending from a bottom wall of said recess to said lower surface and being tapered to receive a steering shaft whereby when a threaded upper end of a steering shaft is inserted in said mounting bore, said mounting bore prevents the upper end of the steering shaft from extending above said common plane, said retaining nut is received in said central recess and threadably engages the upper end of the steering shaft and each of said fasteners is extended through one of said mounting apertures and engages one of said fastener apertures for retaining said center disk against said upper surface of said mounting hub and covering said retaining nut.

* * * * *